United States Patent
Kumar et al.

(10) Patent No.: US 12,443,781 B2
(45) Date of Patent: Oct. 14, 2025

(54) INTEGRATED THERMAL-ELECTRICAL CO-SIMULATION

(71) Applicant: Dell Products L.P., Round Rock, TX (US)

(72) Inventors: Vijender Kumar, Bangalore (IN); Mallikarjun Vasa, Secunderabad (IN); Ashish Shrivastava, Bangalore (IN); Bhyrav Mutnury, Austin, TX (US); Seema P K, Bangalore (IN); Sukumar Muthusamy, Bangalore (IN); Sanjay Kumar, Ranchi (IN); Sunil Pathania, Amb (IN)

(73) Assignee: Dell Products L.P., Round Rock, TX (US)

( * ) Notice: Subject to any disclaimer, the term of this patent is extended or adjusted under 35 U.S.C. 154(b) by 754 days.

(21) Appl. No.: 17/716,527

(22) Filed: Apr. 8, 2022

(65) Prior Publication Data
US 2023/0325569 A1 Oct. 12, 2023

(51) Int. Cl.
*G06F 30/392* (2020.01)
*G06F 119/06* (2020.01)
*G06F 119/08* (2020.01)

(52) U.S. Cl.
CPC ........ *G06F 30/392* (2020.01); *G06F 2119/06* (2020.01); *G06F 2119/08* (2020.01)

(58) Field of Classification Search
USPC ....................................................... 716/100
See application file for complete search history.

(56) References Cited

U.S. PATENT DOCUMENTS

| 7,263,682 | B2 | 8/2007 | Tsai et al. |
| 2008/0288908 | A1* | 11/2008 | Hart ...................... G06F 30/394 716/132 |
| 2011/0047524 | A1 | 2/2011 | Liang et al. |
| 2014/0042657 | A1* | 2/2014 | Mulliken ............... B29C 64/118 425/113 |
| 2018/0174940 | A1* | 6/2018 | Ferguson ............... H01L 23/345 |
| 2020/0033920 | A1* | 1/2020 | Nielsen ............... G05D 23/1917 |
| 2021/0059055 | A1* | 2/2021 | Koul ......................... G06F 30/39 |
| 2021/0307210 | A1* | 9/2021 | Wong ................. H05K 7/20327 |
| 2023/0325569 | A1* | 10/2023 | Kumar .................. G06F 30/392 716/100 |

* cited by examiner

*Primary Examiner* — Mohammed Alam
(74) *Attorney, Agent, or Firm* — Larson Newman, LLP

(57) ABSTRACT

An information handling system includes a memory device and a processor. The memory device includes first data representing a thermal profile of a motherboard, and second data representing a circuit trace of the motherboard. The circuit trace provides a high-speed data interconnection between two or more circuit devices. The processor determines an average temperature of the circuit trace on the motherboard based upon the first data and the second data, and models a trace layout for the circuit trace on the motherboard based upon the average temperature.

15 Claims, 3 Drawing Sheets

INTEGRATED THERMAL-ELECTRICAL CO-SIMULATION

FIELD OF THE DISCLOSURE

This disclosure generally relates to information handling systems and more particularly relates to modeling circuit traces in an information handling system utilizing integrated thermal-electrical co-simulation.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a memory device and a processor. The memory device may include first data representing a thermal profile of a motherboard, and second data representing a circuit trace of the motherboard. The circuit trace may provide a high-speed data interconnection between two or more circuit devices. The processor may determine an average temperature of the circuit trace on the motherboard based upon the first data and the second data, and model a trace layout for the circuit trace on the motherboard based upon the average temperature.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
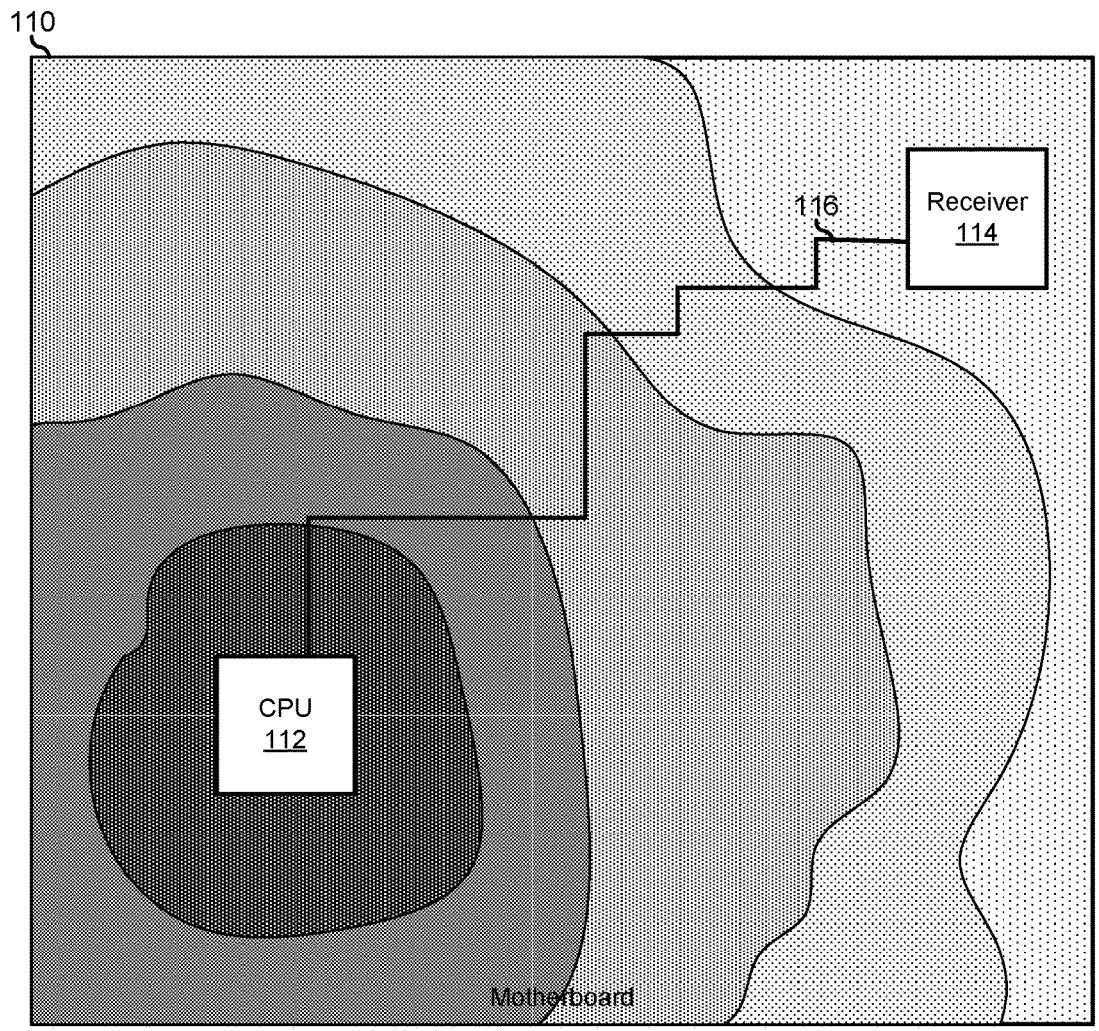
FIG. 1 illustrates a thermal profile of a motherboard in an information handling system according to an embodiment of the current disclosure.
Figure 1:
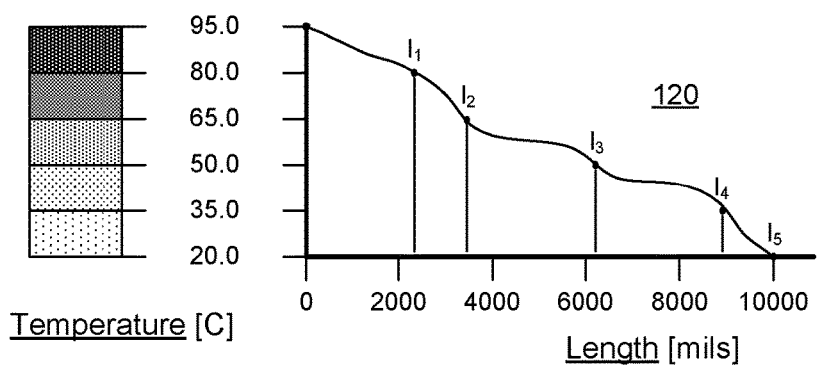

FIG. 1 illustrates a thermal profile 100 of a motherboard 110 that includes a CPU 112 coupled to a receiver 114 via a circuit trace 116. Thermal profile 100 represents a temperature map of heat distribution over motherboard 110. In particular, CPU 112 will be understood to be the major heat producing element on motherboard 110, and so is seen to be in the region of the highest temperature on the motherboard. Further, receiver 114 will be understood to be a relatively minor heat producing element on motherboard 110, and so is seen to be in the region of the lowest temperature on the motherboard. Here, other regions of varying temperature can be seen as generally radiating outward from CPU 112 toward receiver 114, with the hotter regions being nearer to the CPU, and the cooler regions being nearer to the receiver. It will be understood that thermal profile 100 is a simplified representation of the actual thermal characteristics of motherboard 100. That is, the temperature at any given point will be understood to be within a range of temperatures, as indicated by the provided legend, and that the actual thermal profile of a motherboard will likely not have large discrete steps in the temperature, but will exhibit a smoothly varying temperature profile across the motherboard.

Thermal profile 100 may be understood to be derived from any source for characterizing temperature profiles. For example, thermal profile 100 may be understood to be based upon an empirical analysis of motherboard 100, such as by viewing the operating motherboard with a thermal imaging camera, by the placement of temperature sensors on the surface of the operating motherboard, or by other empirical analysis methods. In another example, thermal profile 100 may be understood to be based upon a theoretical analysis of motherboard 100, such as by modeling the heat sources and the thermal characteristics of the motherboard, and generating a model of the thermal profile.

In either case, a thermal curve 120 associated with circuit trace 116 may be generated that illustrates the temperature of the circuit trace along its length between CPU 112 and receiver 114. Here, thermal curve 120 may be seen to exhibit a generally decreasing temperature along the length of circuit trace 116 from CPU 112 to receiver 114. Circuit trace 116 may be understood to represent a signal trace that carries data signals between CPU 112 and receiver 114, and may include portions that are routed on a top or bottom surface of motherboard 110, within one or more layers of the motherboard, and within one or more via between layers of the motherboard, as needed or desired. Motherboard 110 will further be understood to include additional circuit traces, not only between CPU 112 and receiver 114, but also between other elements of the motherboard. Here, each circuit trace will be understood to have its own thermal curve based upon the temperature experienced by the circuit trace.

Motherboard 110 will be understood the be a very simplified motherboard, and a typical motherboard may have one or more additional heat producing elements that would make the associated heat profile much more complex. For example, a motherboard may include one or more additional CPU, one or more memory device, one or more graphics processor unit (GPU), one or more field programmable gate array (FPGA), or other heat producing devices, as needed or desired. In such cases, the thermal profile may have a much more complex complexion with islands of higher temperature regions, islands of lower temperature regions, or the like. In this regard, circuit traces formed in such a motherboard may be understood to have thermal curves that exhibit both falling temperatures along the length of the associated circuit traces and rising temperatures along the length. The teachings of the current disclosure will be understood to be applicable to any circuit trace, and in association with any related thermal curve, as needed or desired.

It has been understood by the inventors of the current disclosure that the increasing thermal budgets for information handling systems results in greater temperature differences across motherboards associated with the information handling systems. As such, the circuit traces instantiated on the motherboards experience greater thermal variation across their lengths. It has been further understood that the thermal curve of any given circuit trace will have an impact on the electrical characteristics of the circuit trace. In particular, the dielectric constant of the medium in which circuit traces are formed is well known to be affected by the temperature of the medium. Changes in the dielectric constant may result in variations in the equivalent series resistance (ESR), the dissipation factor (DF), the loss tangent (Q), or other parameters of the associated circuit traces.

Meanwhile, the relentless increase in signal speeds that the circuit traces are expected to transmit results in narrower design margins for the circuit traces. As a result, previously minor considerations in the design and layout of circuit traces on motherboards are becoming increasingly important to the maintenance of good signal quality. In particular, the impact of the thermal curve on a circuit trace for a high-speed data interface may more strongly impact the signal quality of the signals carried by the circuit trace than in previous generations. For example, in previous generations, it may have been deemed adequate to model circuit traces for high-speed data interfaces with the electrical parameter values at some "room temperature" value (e.g., 20 C). However, such modeling may lead to circuit traces that exhibit poor signal quality margins when confronted with real-world thermal environments. Designers have thus been led to model circuit traces for high-speed data interfaces at the highest temperature experienced by the circuit traces, in order to ensure adequate margin. However, such modeling may lead to over-design of the circuit traces, such as by increasing trace-to-trace spacing, increasing trace dimensions, or the like. Such over-design practices may not be desirable when space on motherboards is highly constrained and may lead to unnecessarily increased costs to fabricate the motherboards.

In a compromise approach, designers have approached the modeling of circuit traces for high-speed data interfaces by dividing the length of the circuit traces into smaller sections, ascribing a temperature for each section, individually modeling each section, and combining the multiple models to form a combined model the entire circuit trace. While such a modeling practice may lead to an optimized design in terms of signal quality and design layout efficiency, the approach of modeling multiple small sections of a circuit trace individually has resulted in increased design time and cost.

In a particular embodiment, rather than dividing the length of a circuit trace into smaller sections and modeling each section based upon an ascribed temperature, as described above, the length of the circuit trace is divided into smaller sections, a temperature is ascribed to each section, and an average temperature for the entire length of the circuit trace is determined. Then the average temperature is utilized to model the entire length of the circuit trace. In this way, modeling needed for each circuit trace is reduced from a large number of modeling runs, each associated with a small section of the trace, to a relatively small calculation of an average temperature for the trace and a single modeling run for the entire trace. As an example, thermal curve 120 is illustrated with enumeration at the borders of each of the thermal zones of thermal profile 100. Here, a first length ($l_1$) shows that trace 116 runs through the hottest thermal zone for 2250 mils, a second length ($l_2$) shows that the trace runs through the next cooler thermal zone for 1100 mils, a third length ($l_{13}$) shows that the trace runs through the next cooler thermal zone for 2900 mils, a fourth length ($l_4$) shows that the trace runs through the next cooler thermal zone for 2800 mils, and a fifth length ($l_5$) shows that trace 116 runs through the coolest thermal zone for 950 mils. Table 1 illustrates a particular method for determining an average temperature for each length, where the length in mils is multiplied by the temperature of the associated section. The resulting values are summed, and the sum is divided by the total length to derive the average temperature. Here, the sum is equal to 663,500. Divided by the total length of 10,000 mils, the average temperature is determined to be 66.35 C. This temperature value may then be utilized in modeling of trace 116 over its entire length of 10,000 mils.

TABLE 1

Average Temperature

| Temp [° C.] | Length [mils] | $T_i * (l_i - l_{i-1})$ |
|---|---|---|
| 95 | 2250 | 213,750 |
| 80 | 1100 | 88,000 |
| 65 | 2900 | 188,500 |
| 50 | 2800 | 140,000 |
| 35 | 950 | 33,250 |
| Total | 10,000 | 663,500 |
| | Average [$T_{avg}$] | 66.36° C. |

More generally, the average temperature can be determined as:

$$T_{avg} = \frac{1}{L} \sum_{i=1}^{N} T_i * (l_i - l_{i-1})$$ Equation 1 where $T_{avg}$ is the average temperature, L is the total length, $T_i$ is the temperature of a respective length of a trace section, and $l_i$ is the length of the trace at the temperature. Note that the highest temperature in the temperature range has been utilized for each individual length segment, but this is not necessarily so. In other cases, the lowest temperature in the temperature range can be utilized for each individual length segment, or an intermediate temperature in the temperature range, such as the middle temperature in the temperature range, may be utilized as needed or desired. Also note that, five temperature ranges were utilized in the current example, but this is not necessarily so, and a greater or lesser number of temperature ranges may be utilized as needed or desired. In particular, because the processing needed to determine the average temperature of a trace is trivial in comparison with the processing needed to run a model simulation of the trace, the number of temperature ranges may be increased to any granularity of temperature, as needed or desired. Moreover, where a particular trace curve can be described over its length by a particular function (e.g., a function T (x)), the average temperature may be determined as:

$$T_{avg} = \frac{1}{L}\int_0^L T(x)dx. \quad \text{Equation 2}$$

The inventors of the current disclosure have found that the simulation results utilizing the multiple simulations of small, temperature adjusted trace segments and the simulation results utilizing a single modeled trace using the average temperature are in agreement to within 1%. Thus the current embodiments provide for the cost-effective simulation of traces within a motherboard that yields trace designs that provide good signal quality and motherboard layout efficiency.

Figure 2:
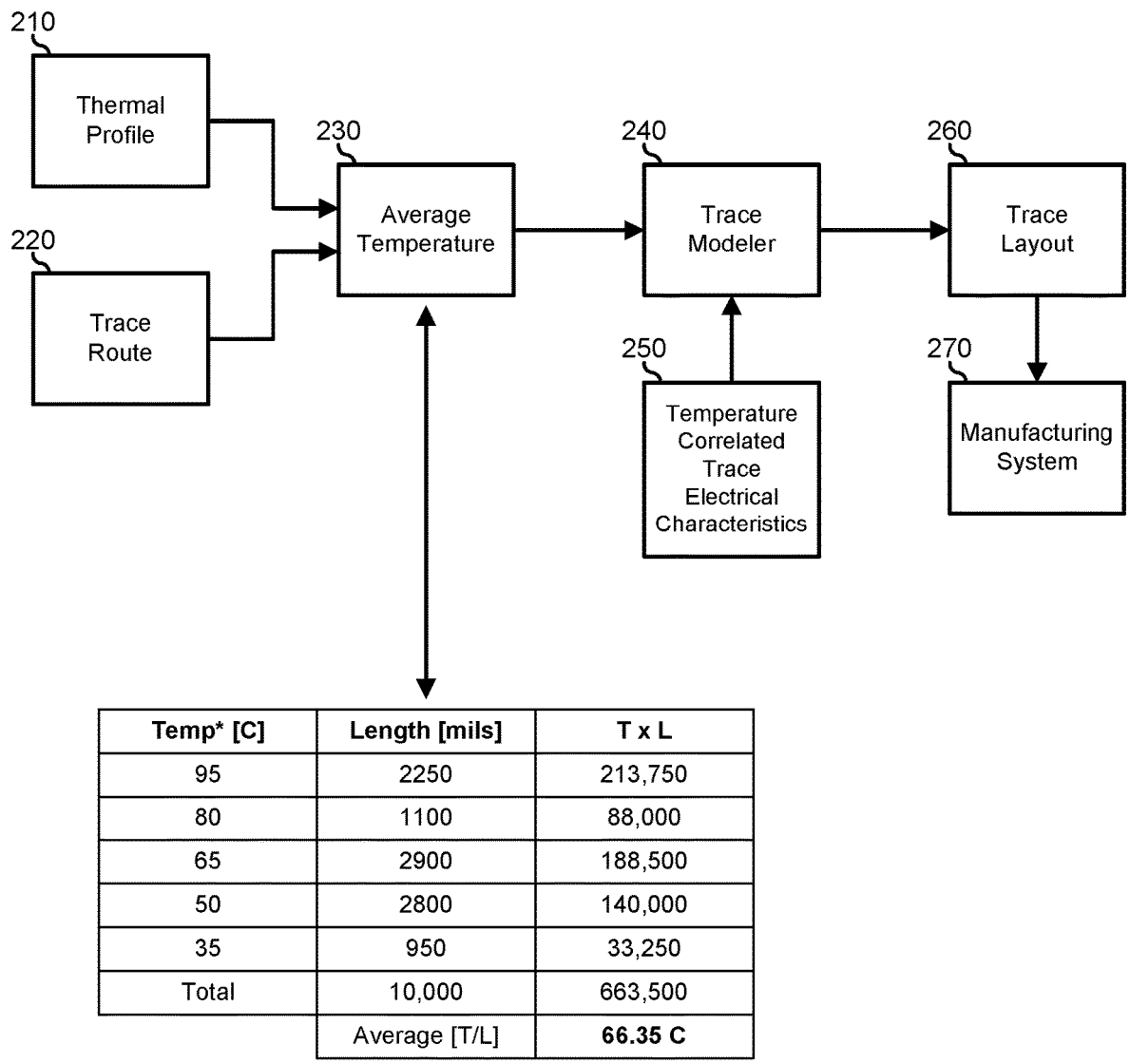
FIG. 2 is a block diagram of an information handling system for modeling circuit traces based upon the thermal profile of FIG. 1.

FIG. 2 illustrates a design simulation system 200 for modeling circuit traces based upon the motherboard thermal profiles such as thermal profile 100 of FIG. 1. Information handling system 200 includes a thermal profile model 210, a trace route model 220, an average temperature module 230, a trace modeler 240, a trace parameter model 250, and a manufacturing system 270. Information handling system 200 operates to provide a trace layout 260. The design simulation system 200 represents one or information handling systems, such as information handling system 300 as described below with respect to FIG. 3, and may represent a dedicated system, or a general-purpose processing system that includes programing that provides one or more of the functions and features as described herein. The thermal profile model 210, trace route model 220, average temperature module 230, trace modeler 240, trace parameter model 250 may implemented in, calculated by, or executed by any suitable hardware circuitry, such as a CPU, a FPGA, or the like.

The thermal profile model 210 represents a data representation of a thermal profile for the design of a particular motherboard, such as motherboard 110, may typically represent the motherboard as a surface in an X-Y coordinate system, wherein the various thermal zones are represented as areas within the surface that are defined by border curves in the X-Y coordinate system. Thermal profile model 210 may be derived by Computational Fluid Dynamics, by empirical analysis, theoretical modeling, or other modeling methods, as needed or desired. Trace route model 220 represents the path of a particular circuit trace within the motherboard that provides a high-speed data interconnection between two or more components placed on the motherboard, or connected thereto. Trace route model 220 will typically be understood to correlate the circuit path between the components within the X-Y coordinate system, and may include circuit vias in the motherboard that extend into a Z dimension of the motherboard as needed or desired. Trace route model 220 may be derived by other design modules configured for routing circuit traces within a motherboard, as needed or desired.

Average temperature module 230 represents an element of design simulation system 200, such as a hardware element, a software element, or a combination thereof, as needed or desired. Average temperature module 230 will be understood to receive as inputs, data from thermal profile model 210 and trace route model 220, and will operate to derive an average temperature for the circuit trace modeled in the trace route model. For example, where motherboard 110 represents the modeled motherboard, and circuit trace 116 represents the modeled circuit trace, average temperature module 230 may operate to determine that the average temperature of the trace is 66.35 C. Average temperature module 230 provides the derived average temperature to trace modeler 240, which in turn receives the electrical parameters for modeling a trace at the average temperature from trace parameter model 250. Trace modeler 240 then operates to model the specific design of the circuit trace to provide trace layout 260, which represents the physical parameters and fabrication features of the circuit trace that will be instantiated in the physical motherboard. The details of trace modeling are known in the art and will not be further described herein, except as may be needed to illustrate the current embodiments. The manufacturing system 270 operates to receive the design layout for the motherboard and fabricates the design layout into physical motherboards.

Figure 3:
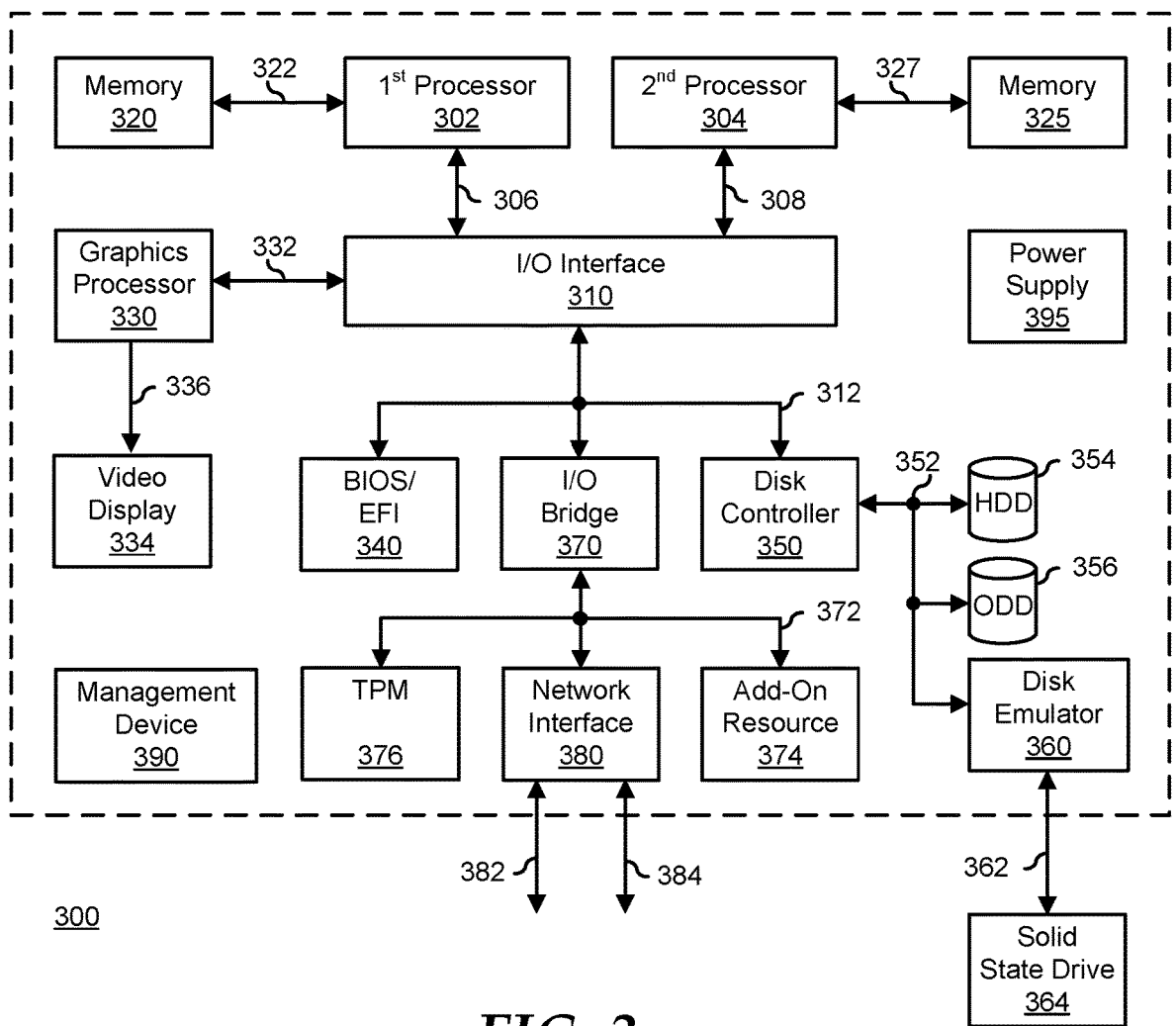
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smartphone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable mediums for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below and operates to perform one or more of the methods described below. Information handling system 300 includes a processors 302 and 304, an input/output (I/O) interface 310, memories 320 and 325, a graphics processor 330, a video display 334, a basic input and output system/ universal extensible firmware interface (BIOS/UEFI) module 340, a disk controller 350, a hard disk drive (HDD) 354, an optical disk drive (ODD) 356, a disk emulator 360 connected to an external solid state drive (SSD) 364, an I/O bridge 370, one or more add-on resources 374, a trusted platform module (TPM) 376, a network interface 380, a management device 390, and a power supply 395. Processors 302 and 304, I/O interface 310, memory 320, graphics processor 330, BIOS/UEFI module 340, disk controller 350, HDD 354, ODD 356, disk emulator 360, SSD 364, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with the information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics processor 330 is connected to I/O interface 310 via a graphics interface 332, and provides a video display output 336 to video display 334. In a particular embodiment, information handling system 300 includes separate memories that are dedicated to each of processors 302 and 304 via separate memory interfaces. An example of memories 320 and 330 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes Peripheral Component Interconnect Express (PCIe) an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on a separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, the management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other tasks for managing and controlling the operation of information handling system 300. Management device 390 can operate of a separate power plane from the components of the host environment so that the management device receives power to manage information handling system 300 when the information handling system is otherwise shut down. An example of management device 390 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a memory device configured to store machine-executable code, and including first data representing a thermal profile of a motherboard, and second data representing a circuit trace of the motherboard, the circuit trace providing a high-speed data interconnection between two or more circuit devices; and
   a processor configured to determine an average temperature of the circuit trace on the motherboard based upon the first data and the second data, and to model a trace layout for the circuit trace on the motherboard based upon the average temperature, wherein the memory device further includes third data representing temperature correlated electrical parameters of the motherboard, and wherein the electrical parameters include at least one of a dielectric constant of a dielectric material of the motherboard, a loss tangent of a conductor material of the motherboard, and a resistivity of the conductor material.

2. The information handling system of claim 1, wherein in the determination of the average temperature, the processor is further configured to divide a total length of the circuit trace into a plurality of trace segments.

3. The information handling system of claim 2, wherein in the determination of the average temperature, the processor is further configured, for each trace segment, to determine a temperature of the trace segment based upon the first data and the second data.

4. The information handling system of claim 3, wherein in the determination of the average temperature, the processor is further configured, for each trace segment, to determine a product of the temperature of the trace segment and a length of the trace segment.

5. The information handling system of claim 4, wherein in the determination of the average temperature, the processor is further configured to determine a sum of the products of the temperatures of each trace segments and the lengths of each trace segment.

6. The information handling system of claim 5, wherein in the determination of the average temperature, the processor is further configured to divide the sum by the total length.

7. The information handling system of claim 1, wherein the model of the trace layout is further based upon a portion of the third data, the portion of the third data being associated with the average temperature.

8. A method, comprising:
   storing, on a memory device of an information handling system, first data representing a thermal profile of a motherboard, and second data representing a circuit trace of the motherboard, the circuit trace providing a high-speed data interconnection between two or more circuit devices;
   determining, by a processor of the information handling system, an average temperature of the circuit trace on the motherboard based upon the first data and the second data;
   modeling a trace layout for the circuit trace on the motherboard based upon the average temperature; and
   storing, on the memory device, third data representing temperature correlated electrical parameters of the motherboard, wherein the electrical parameters include at least one of a dielectric constant of a dielectric material of the motherboard, a loss tangent of a conductor material of the motherboard, and a resistivity of the conductor material.

9. The method of claim 8, wherein in determining the average temperature, the method further comprises:
   dividing a total length of the circuit trace into a plurality of trace segments.

10. The method of claim 9, wherein in determining the average temperature, the method further comprises:
    determining a temperature of each trace segment based upon the first data and the second data.

11. The method of claim 10, wherein in determining the average temperature, the method further comprises:
    determining a product of the temperature of each trace segment and a length of each associated trace segment.

12. The method of claim 11, wherein in determining the average temperature, the method further comprises:
    determining a sum of the products of the temperatures of each trace segments and the lengths of each trace segment.

13. The method of claim 12, wherein in determining the average temperature, the method further comprises:
    dividing the sum by the total length.

14. The method of claim 8, wherein modeling the trace layout is further based upon a portion of the third data, the portion of the third data being associated with the average temperature.

15. An information handling system, comprising:
    a memory device configured to store machine-executable code, and including first data representing a thermal profile of a motherboard, and second data representing a circuit trace of the motherboard, the circuit trace providing a high-speed data interconnection between two or more circuit devices;
    a processor configured to determine an average temperature of the circuit trace on the motherboard based upon the first data and the second data, and to model a trace layout for the circuit trace on the motherboard based upon the average temperature; and a manufacturing system configured to fabricate the motherboard based upon the model of the trace;

wherein in determining the average temperature, the processor is further configured to divide a total length of the circuit trace into a plurality of trace segments, for each trace segment, to determine a temperature of the trace segment based upon the first data and the second data, for each trace segment, to determine a product of the temperature of the trace segment and a length of the trace segment, to determine a sum of the products of the temperatures of each trace segments and the lengths of each trace segment, and to divide the sum by the total length.

* * * * *